US007639886B1

(12) United States Patent
Rastogi

(10) Patent No.: US 7,639,886 B1
(45) Date of Patent: Dec. 29, 2009

(54) DETERMINING SCALAR QUANTIZERS FOR A SIGNAL BASED ON A TARGET DISTORTION

(75) Inventor: Anubha Rastogi, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 837 days.

(21) Appl. No.: 10/958,802

(22) Filed: Oct. 4, 2004

(51) Int. Cl.
G06K 9/00 (2006.01)
(52) U.S. Cl. ..................................... 382/251
(58) Field of Classification Search ................. 382/251
See application file for complete search history.

(56) References Cited

U.S. PATENT DOCUMENTS

| | | | |
|---|---|---|---|
| 4,217,571 A | 8/1980 | Hughes et al. | |
| 4,229,810 A | 10/1980 | Thompson | |
| 4,583,410 A | 4/1986 | O'Neil | |
| 4,599,567 A | 7/1986 | Goupillaud et al. | |
| 4,633,449 A | 12/1986 | Ingram et al. | |
| 4,644,507 A | 2/1987 | Ziolkowski | |
| 4,706,499 A | 11/1987 | Anderson | |
| 4,707,812 A | 11/1987 | Martinez | |
| 4,752,916 A | 6/1988 | Loewenthal | |
| 4,768,174 A | 8/1988 | Castle | |
| 4,780,859 A | 10/1988 | Hadidi et al. | |
| 4,884,247 A | 11/1989 | Hadidi et al. | |
| 4,904,073 A | 2/1990 | Lawton et al. | |
| 4,974,187 A | 11/1990 | Lawton | |
| 4,976,333 A | 12/1990 | Pascouet | |
| 5,000,183 A | 3/1991 | Bonnefous | |
| 5,014,134 A | 5/1991 | Lawton et al. | |
| 5,068,911 A | 11/1991 | Resnikoff et al. | |

| | | | |
|---|---|---|---|
| 5,073,964 A | 12/1991 | Resnikoff | |

(Continued)

FOREIGN PATENT DOCUMENTS

| EP | 00701375 | 3/1996 |
|---|---|---|
| EP | 00855838 | 7/1998 |
| WO | 9738533 | 10/1997 |
| WO | 9828917 | 7/1998 |
| WO | 9840842 | 9/1998 |
| WO | 9844455 | 10/1998 |

OTHER PUBLICATIONS

David Taubman et al., "Rate-Distortion Optimized Interactive Browsing of JPEG2000 Images" Proceedings 2003 International Conference, vol. 2, pp. 765-768, Sep. 14-17, 2003.

(Continued)

Primary Examiner—Vikkram Bali
Assistant Examiner—Eueng-Nan Yeh
(74) Attorney, Agent, or Firm—Fish & Richardson P.C.

(57) ABSTRACT

Methods and apparatus implementing systems and techniques for determining quantizer values for a signal. In general, in one implementation, a technique includes: obtaining a target distortion and a transformed signal having sub-bands resulting from a source signal being transformed by a wavelet-based decomposition; distributing the target distortion among the sub-bands based on energy weights to produce target sub-band distortions; ascertaining actual sub-band distortion values that result at different grades of quantization; determining quantizer values for the sub-bands, including interpolating between at least two of the quantization grades; and quantizing the sub-bands with the determined quantizer values. The signal may be a digital image. Additionally, in another implementation, determining the quantizer values can involve determining approximations of sub-band coefficient quantization error rather than performing the interpolation, in which case, the ascertaining operation need not be performed.

30 Claims, 4 Drawing Sheets

U.S. PATENT DOCUMENTS

| | | |
|---|---|---|
| 5,081,645 A | 1/1992 | Resnikoff et al. |
| 5,101,446 A | 3/1992 | Resnikoff et al. |
| 5,106,385 A | 4/1992 | Allen et al. |
| 5,121,191 A | 6/1992 | Cassereau et al. |
| 5,148,498 A | 9/1992 | Resnikoff et al. |
| 5,173,879 A | 12/1992 | Cung et al. |
| 5,193,077 A | 3/1993 | Weiglein et al. |
| 5,253,530 A | 10/1993 | Letcher, III |
| 5,262,958 A | 11/1993 | Chui et al. |
| 5,272,530 A | 12/1993 | Cassereau |
| 5,301,020 A | 4/1994 | Cassereau |
| 5,315,670 A | 5/1994 | Shapiro |
| 5,321,776 A | 6/1994 | Shapriro |
| 5,347,479 A | 9/1994 | Miyazaki |
| 5,347,494 A | 9/1994 | Andersen |
| 5,359,627 A | 10/1994 | Resnikoff |
| 5,377,302 A | 12/1994 | Tsiang |
| 5,384,725 A | 1/1995 | Coifman et al. |
| 5,384,869 A | 1/1995 | Wilkinson et al. |
| 5,388,182 A | 2/1995 | Benedetto et al. |
| 5,392,255 A | 2/1995 | LeBras et al. |
| 5,398,067 A | 3/1995 | Sakamoto |
| 5,408,580 A | 4/1995 | Stautner et al. |
| 5,412,741 A | 5/1995 | Shapiro |
| 5,414,780 A | 5/1995 | Carnahan |
| 5,420,636 A | 5/1995 | Kojima |
| 5,426,618 A | 6/1995 | Chen et al. |
| 5,436,447 A | 7/1995 | Shew |
| 5,439,483 A | 8/1995 | Duong-Van |
| 5,453,945 A | 9/1995 | Tucker et al. |
| 5,454,047 A | 9/1995 | Chang et al. |
| 5,471,991 A | 12/1995 | Shinnar |
| 5,477,272 A | 12/1995 | Zhang et al. |
| 5,481,269 A | 1/1996 | Imhoff et al. |
| 5,495,292 A | 2/1996 | Zhang et al. |
| 5,495,554 A | 2/1996 | Edwards et al. |
| 5,497,398 A | 3/1996 | Tzannes et al. |
| 5,497,435 A | 3/1996 | Berger |
| 5,497,777 A | 3/1996 | Abdel-Malek et al. |
| 5,500,902 A | 3/1996 | Stockham, Jr. et al. |
| 5,504,487 A | 4/1996 | Tucker |
| 5,511,155 A | 4/1996 | Yamaguchi |
| 5,513,273 A | 4/1996 | Ito |
| 5,526,299 A | 6/1996 | Coifman et al. |
| 5,528,725 A | 6/1996 | Hui |
| 5,534,927 A | 7/1996 | Shishikui et al. |
| 5,537,344 A | 7/1996 | Isshiki et al. |
| 5,537,365 A | 7/1996 | Sitoh |
| 5,537,493 A | 7/1996 | Wilkinson |
| 5,546,477 A | 8/1996 | Knowles et al. |
| 5,550,788 A | 8/1996 | Pavone et al. |
| 5,561,431 A | 10/1996 | Peele et al. |
| 5,563,960 A | 10/1996 | Shapiro |
| 5,565,920 A | 10/1996 | Lee et al. |
| 5,576,548 A | 11/1996 | Clarke et al. |
| 5,583,952 A | 12/1996 | Resnikoff et al. |
| 5,587,931 A | 12/1996 | Jones et al. |
| 5,587,965 A | 12/1996 | Dragoset, Jr. et al. |
| 5,588,023 A | 12/1996 | Ho |
| 5,590,222 A | 12/1996 | Kojima |
| 5,590,650 A | 1/1997 | Genova |
| 5,592,171 A | 1/1997 | Jordan |
| 5,592,226 A | 1/1997 | Lee et al. |
| 5,598,481 A | 1/1997 | Nishikawa et al. |
| 5,600,373 A | 2/1997 | Chui et al. |
| 5,602,589 A | 2/1997 | Vishwanath et al. |
| 5,602,760 A | 2/1997 | Chacon et al. |
| 5,604,824 A | 2/1997 | Chui et al. |
| 5,606,642 A | 2/1997 | Stautner et al. |
| 5,610,843 A | 3/1997 | Chou |
| 5,612,700 A | 3/1997 | Tucker |
| 5,615,287 A | 3/1997 | Fu et al. |
| 5,619,998 A | 4/1997 | Abdel-Malek et al. |
| 5,623,939 A | 4/1997 | Garfield |
| 5,627,907 A | 5/1997 | Gur et al. |
| 5,631,610 A | 5/1997 | Sandberg et al. |
| 5,636,246 A | 6/1997 | Tzannes et al. |
| 5,638,068 A | 6/1997 | Nickerson |
| 5,638,823 A | 6/1997 | Akay et al. |
| 5,642,166 A | 6/1997 | Shin et al. |
| 5,646,600 A | 7/1997 | Abdel-Malek et al. |
| 5,657,085 A | 8/1997 | Katto |
| 5,661,822 A | 8/1997 | Knowles et al. |
| 5,663,929 A | 9/1997 | Pavone et al. |
| 5,666,434 A | 9/1997 | Nishikawa et al. |
| 5,666,475 A | 9/1997 | Salesin et al. |
| 5,667,244 A | 9/1997 | Ito et al. |
| 5,668,850 A | 9/1997 | Abdel-Malek |
| 5,671,294 A | 9/1997 | Rogers et al. |
| 5,671,330 A | 9/1997 | Sakamoto et al. |
| 5,673,191 A | 9/1997 | Chapin et al. |
| 5,673,332 A | 9/1997 | Nishikawa et al. |
| 5,675,551 A | 10/1997 | Sitoh |
| 5,675,669 A | 10/1997 | Kim |
| 5,682,152 A | 10/1997 | Wang et al. |
| 5,684,693 A | 11/1997 | Li |
| 5,687,725 A | 11/1997 | Wendt |
| 5,689,429 A | 11/1997 | Depiante |
| 5,699,286 A | 12/1997 | Lee et al. |
| 5,703,965 A | 12/1997 | Fu et al. |
| 5,706,220 A | 1/1998 | Vafai et al. |
| 5,710,432 A | 1/1998 | Bell |
| 5,710,835 A | 1/1998 | Bradley |
| 5,715,280 A | 2/1998 | Sandberg et al. |
| 5,717,791 A | 2/1998 | Labaere et al. |
| 5,724,070 A | 3/1998 | Denninghoff et al. |
| 5,724,138 A | 3/1998 | Reich et al. |
| 5,729,484 A | 3/1998 | Mack et al. |
| 5,729,506 A | 3/1998 | Dragoset, Jr. et al. |
| 5,729,691 A | 3/1998 | Agarwal |
| 5,734,755 A | 3/1998 | Ramchandran et al. |
| 5,737,448 A | 4/1998 | Gardos |
| 5,740,036 A | 4/1998 | Ahuja et al. |
| 5,740,268 A | 4/1998 | Nishikawa et al. |
| 5,745,382 A | 4/1998 | Vilim et al. |
| 5,745,392 A | 4/1998 | Ergas et al. |
| 5,745,604 A | 4/1998 | Rhoads |
| 5,747,749 A | 5/1998 | Bednarczyk et al. |
| 5,748,116 A | 5/1998 | Chui et al. |
| 5,748,471 A | 5/1998 | Grande |
| 5,748,786 A | 5/1998 | Zandi et al. |
| 5,751,716 A | 5/1998 | Tzannes et al. |
| 5,754,438 A | 5/1998 | Naono et al. |
| 5,754,793 A | 5/1998 | Eom et al. |
| 5,757,309 A | 5/1998 | Brooks et al. |
| 5,757,852 A | 5/1998 | Jericevic et al. |
| 5,757,974 A | 5/1998 | Impagliazzo et al. |
| 5,761,341 A | 6/1998 | Go |
| 5,764,805 A | 6/1998 | Martucci et al. |
| 5,774,357 A | 6/1998 | Hoffberg et al. |
| 5,776,073 A | 7/1998 | Garfield et al. |
| 5,777,678 A | 7/1998 | Ogata et al. |
| 5,778,881 A | 7/1998 | Sun et al. |
| 5,781,144 A | 7/1998 | Hwa |
| 5,781,502 A | 7/1998 | Becquey |
| 5,781,881 A | 7/1998 | Stegmann |
| 5,781,888 A | 7/1998 | Herre |
| 5,782,429 A | 7/1998 | Mead |
| 5,784,285 A | 7/1998 | Tamaki et al. |
| 5,787,207 A | 7/1998 | Golin |
| 5,790,131 A | 8/1998 | Liang et al. |
| 5,790,185 A | 8/1998 | Auzerais et al. |
| 5,790,694 A | 8/1998 | Maruo |
| 5,796,434 A | 8/1998 | Lempel |

| | | | |
|---|---|---|---|
| 5,798,794 A | 8/1998 | Takahashi | |
| 5,799,100 A | 8/1998 | Clarke et al. | |
| 5,799,112 A | 8/1998 | de Queiroz et al. | |
| 5,801,305 A | 9/1998 | Kawai et al. | |
| 5,802,369 A | 9/1998 | Ganesh et al. | |
| 5,802,481 A | 9/1998 | Prieto | |
| 5,808,467 A | 9/1998 | Ochi et al. | |
| 5,812,971 A | 9/1998 | Herre | |
| 5,814,897 A | 9/1998 | Ito et al. | |
| 5,815,097 A | 9/1998 | Schwartz et al. | |
| 5,815,198 A | 9/1998 | Vachtsevanos et al. | |
| 5,818,525 A | 10/1998 | Elabd | |
| 5,819,215 A | 10/1998 | Dobson et al. | |
| 5,821,751 A | 10/1998 | Wendt et al. | |
| 5,821,882 A | 10/1998 | Kazato et al. | |
| 5,822,370 A | 10/1998 | Graupe | |
| 5,822,436 A | 10/1998 | Rhoads | |
| 5,822,459 A | 10/1998 | Macy | |
| 5,825,935 A | 10/1998 | Murakoshi | |
| 5,825,936 A | 10/1998 | Clarke et al. | |
| 5,828,849 A | 10/1998 | Lempel et al. | |
| 5,831,625 A | 11/1998 | Rich et al. | |
| 5,832,030 A | 11/1998 | Tzannes et al. | |
| 5,838,377 A | 11/1998 | Greene | |
| 6,269,193 B1 | 7/2001 | Young et al. | |
| 6,351,491 B1* | 2/2002 | Lee et al. | 375/240.03 |
| 6,801,665 B1 | 10/2004 | Atsumi et al. | |
| 6,909,810 B2 | 6/2005 | Maeda | |
| 6,985,632 B2 | 1/2006 | Sato et al. | |
| 7,035,473 B1 | 4/2006 | Zeng et al. | |
| 7,127,117 B2 | 10/2006 | Sano et al. | |
| 2003/0210824 A1* | 11/2003 | Falzon et al. | 382/240 |
| 2004/0047511 A1* | 3/2004 | Tzannes et al. | 382/232 |
| 2005/0002573 A1* | 1/2005 | Joshi et al. | 382/232 |
| 2006/0008162 A1* | 1/2006 | Chen et al. | 382/239 |

OTHER PUBLICATIONS

Jorg Ritter, "Wavelet based image compression using FPGAs", http://sundoc.bibliothek.uni-halle.de/diss-online/02/03H033/of_index.htm, Dec. 6, 2002.

T. M. Trenschel et al., "Region-Based Guaranteed Image Quality in JPEG2000" Proceedings of the 2003 Joint Conference of the Fourth International Conference, vol. 1, pp. 464-468, Dec. 2003.

T. Trenschel et al., "Using JPEG2000 On-Board Mini-Satellites for Image-Driven Compression" Proceedings 2003 IEEE International vol. 3, pp. 2033-2035, Jul. 2003.

"Tiles and Tile Components: Enable Simplified Processing" The University of Arizona, pp. 18-32, (published before this application Oct. 4, 2004).

Al Bovik, "Handbook of Image & Video Processing", pp. 53-67, 117-123, 289-300, 301-312, 495-512, 575-584 and 629-643, Academic Press, 2000, (published before this application Oct. 4, 2004).

Pankaj N. Topiwala, "Time-Frequency Analysis, Wavelets And Filter Banks", pp. 1-81, (2000), (published before this application Oct. 4, 2004).

"Wavelet Basics", http://www.monash.edu.au/cmcm/wavelet/wbasic.htm, Nov. 12, 1998.

"Highly Efficient Image Compression- Hardware Solution (HFEE-DP)", http://www.luratech.com/rdprojects/reprojects01_e.html, Nov. 19, 1998.

"LuraWave Software, Development Kit for C/C++", LuRaTech GmbH 1998, pp. 1-61, (published before this application Oct. 4, 2004).

Stephane G. Mallat, "Multifrequency Channel Decompositions of Images and Wavelet Models", IEEE Transactions on Acoustics, Speech, and Signal Processing, vol. 37, No. 12, Dec. 1989, pp. 2091-2110.

Amara Graps, "An Introduction to Wavlets", IEEE Computational Science & Engineering, Summer 1995, pp. 50-61.

"An Introduction to Wavelets", http://www.amara.com/IEEEwave/IEEEwavelet.html, Nov. 12, 1998.

"Wavelets Theory", Covering Next Generation Computing and Communications Technologies, http://www.wave-report.com/tutorials/Wavelets.com, printed Sep. 10, 2004.

"Our New Standard!", JPEG 2000, file://C:Document, http://www.jpeg.org/jpeg2000/j2K...html, printed Sep. 10, 2004.

Amara Graps, "An Introduction to Wavelets", Institute of Electrical and Electronics Engineers, Inc., IEEE Computational Science and Engineering, 1995, updated Jan. 2003.

"JPEG 2000 Part I with Cor. 1, Cor. 2, Cor. 3 and DCor.4, Amd.1, FPDAM.2", ISO/IEC JTC1/SC29 WGI, JPEG 2000, May 7, 2002.

"JPEG 2000 Part II Final Committee Draft", ISO/IEC JTC1/SC29 WG1, JPEG 2000, Dec. 7, 2000.

Adobe Systems Incorporated, "Optimization Options for GIF and PNG-8 Formats" Adobe Photoshop 7.0 User Guide, 2002, Chapter 14, 3 pages (Published before this application Oct. 4, 2004).

Christopoulos et al. "The JPEG2000 Still Image Coding System: An Overview," IEEE Trans. Consumer Electronics, vol. 46, Iss. 4, Nov. 2000, pp. 1103-1127.

LeCun, et al.,"DjVu: A Compression Method for Distributing Scanned Documents in Color over the Internet", Color 6, IST, 1998, 4 pages. (Published before this application Oct. 4, 2004).

Lin, et al. "Hybrid Image Coding for Real-Time Computer Screen Video Transmission", Visual Communications and Image Processing (VCIP 2004), San Jose, California, USA, Jan. 2004, SPIE vol. 5308, pp. 946-957 (12 pages).

Xerox Technology, "MRC & JBIG2", downloaded from the internet at http://www.xeroxtechnology.com/mrc on Mar. 9, 2004, 3 pages.

Christopoulos at al.; "JPEG2000: The New Still Picture Compression. Stamdard," downloaded from the internet at http://www.acm.org/sigs/sigmm/MM2000/ep/christopoulos/ on Apr. 26, 2005, 15 pages.

Jung et al.; "Segmentation and Compression of Documents in JPEG2000," www.math.tu-berlin.de/~seiler/JPEG2000final1.1.pdf, 2003, 7 pages, (Nov. 2003).

Marcellin et al.; "An Overview of JPEG-2000," Originally appeared Proc. of IEEE Data Compression Conference, pp. 523-541, 2000; 19 pages, (Mar. 2000).

Skodras et al.; "JPEG2000: The Upcoming Still Image Compression Standard," Pattern Recognition Letters, vol. 22, Issue 12, Oct. 2001, pp. 1337-1345.

Yu et al.; "An Efficient Packetization Algorithm for JPEG2000," http://ccrc.wusti.edu/~jefritts/papers/weiyu_icip02.pdf 2002, 4 pages, (Sep. 2002).

* cited by examiner

DETERMINING SCALAR QUANTIZERS FOR A SIGNAL BASED ON A TARGET DISTORTION

BACKGROUND OF THE INVENTION

The present application describes systems and techniques relating to determining scalar quantizers for a signal, for example, determining scalar quantizers to generate an image of a desired distortion in wavelet-based compression.

Quantization is a process by which an input signal is limited to a set of discrete values that reduce the precision of the signal. Scalar quantization of digital signals, such as digital images, is used in various lossy data compression schemes, including the Joint Photographic Experts Group (JPEG) 2000 Recommendation|International Standard. In transform based lossy image compression systems, such as a JPEG 2000 system, the extent of compression is typically controlled by providing the compression system with a target, either a net compressed file size or an indication of how much loss of image quality is acceptable. For example, at the user interface level, an image quality indication can be input as a quality number of 1-10 or as a qualitative description ('low quality', 'medium quality', or 'high quality'). In order to maintain consistency across images, the subjective quality inputs can be mapped to objective estimates of image distortion, such as peak-signal-to-noise-ratio (PSNR).

In the context of wavelet-based compression, such as in JPEG 2000, a desired PSNR can be achieved using a post-compression rate-distortion (PCRD) optimization. The PCRD method is a complex algorithm that operates on a wavelet-transformed and compressed image, assembling a smaller bitstream from the original compressed bitstream such that the new bitstream is optimal with respect to image distortion. In JPEG 2000, image compression can involve application of a discrete wavelet transform (DWT) to produce image transform coefficients, quantization of the transform coefficients, and entropy coding of the quantized coefficients. Valid JPEG 2000 codestreams can also be created without applying PCRD.

SUMMARY OF THE INVENTION

In general, in one aspect, the invention features operations including: obtaining a target distortion and a transformed signal, the target distortion indicating desired signal quality, and the transformed signal including sub-components resulting from a source signal being transformed by a multi-resolution decomposition; distributing the target distortion among the sub-components to produce target sub-component distortions; determining quantizer values for the sub-components based on the target sub-component distortions; and quantizing the sub-components with the determined quantizer values. The sub-components can be sub-bands resulting from the source signal being transformed by a wavelet-based, frequency-dependent, multi-resolution decomposition, and distributing the target distortion can include distributing the target distortion among sub-bands based on energy weights of the sub-bands.

Determining the quantizer values can involve determining approximations of sub-band coefficient quantization error equal to the determined quantizer values times a parameter that is defined such that a total distortion after quantization is necessarily less than or equal to the target distortion. The determined quantizer values for the sub-bands can satisfy $$\Delta_b = \frac{2}{\alpha_b \gamma_b} \sqrt{\frac{D}{n_b \sum_{i=1}^{NB} 1/\gamma_i}},$$

where $\Delta_b$ is a quantizer value for sub-band b, $\alpha_b/2$ is the parameter, D is the target distortion, $n_b$ is number of samples in sub-band b, $\gamma_b$ is the energy weight of sub-band b, and NB is a total number of sub-bands. Moreover, $\alpha_b$ may equal 0.4 for all of the sub-bands.

The operations can also include ascertaining actual sub-band distortion values that result at different grades of quantization in a current sub-band, and determining the quantizer values can involve, if a target sub-band distortion for the current sub-band falls between at least two of the actual sub-band distortion values determined for the current sub-band, interpolating between at least two of the quantization grades based on the at least two actual sub-band distortion values to determine a quantizer value for the current sub-band corresponding to the target sub-band distortion for the current sub-band. The operations can also include removing one or more least-significant bit levels (e.g., bit planes of a two-dimensional data set) in binary sub-band data to produce at least one of the different grades of quantization corresponding to exponential-powers-of-two quantizers. Distributing the target distortion can include distributing the target distortion among the sub-bands in inverse proportion to the energy weights of the sub-bands, and determining quantizer values can further include determining quantizer values for the sub-bands starting at a highest resolution level and ending at a lowest resolution level of the sub-bands, and if one or more sub-bands of a current resolution level cannot satisfy one or more corresponding target sub-band distortions, redistributing an unsatisfied portion of the one or more corresponding target sub-band distortions to target sub-band distortions for lower resolution sub-bands in inverse proportion to energy weights of the lower resolution sub-bands.

The operations can also include presenting a preview of the quantized, transformed signal to demonstrate a result of the target distortion on the transformed signal; and repeating the distributing, determining, quantizing and presenting operations, but not the ascertaining operation, in response to a change in the target distortion. Interpolating can include employing quadratic, linear, or other types of interpolation. The operations can also include compressing the quantized, transformed signal to form a compressed signal; and applying a post-compression rate-distortion optimization on the compressed signal. Obtaining the target distortion can include generating a target peak-signal-to-noise ratio from a received quality measure, and obtaining the transformed signal can include receiving at least a portion of a digital image.

In another aspect, the invention features operations including: obtaining a target distortion and a signal, the target distortion indicating desired signal quality; ascertaining actual distortion values that result at different grades of quantization of the signal; interpolating between at least two of the quantization grades based on at least two of the actual distortion values to determine a quantizer value corresponding to the target distortion; and quantizing the signal with the determined quantizer value. The signal can be a two-dimensional data set, and the operations can include removing one or more least-significant bit planes.

The signal can include a first sub-band of a larger transformed signal including multiple sub-bands, including the first sub-band, resulting from a source signal being transformed by a wavelet-based decomposition; and obtaining the target distortion for the first sub-band can include receiving a larger target distortion for the larger transformed signal, and distributing the larger target distortion among the multiple sub-bands to produce target sub-band distortions, including the target distortion for the first sub-band. Distributing the larger target distortion can include distributing the larger target distortion among the multiple sub-bands based on energy weights of the multiple sub-bands. The operations can also include redistributing an unsatisfied portion of a target sub-band distortion for a current sub-band to subsequent sub-bands based on energy weights of the subsequent sub-bands. And the operations can also include presenting a preview of the quantized signal to demonstrate a result of the target distortion on the signal; and repeating the interpolating, quantizing and presenting operations, but not the ascertaining operation, in response to a change in the target distortion.

According to another aspect of the invention, a system can include a data processing apparatus and a machine-readable medium tangibly embodying a software product including instructions operable to cause the data processing apparatus to present an imaging software user interface and to perform operations including: obtaining a target distortion and a transformed image, the target distortion indicating desired image quality, and the transformed image including sub-bands resulting from a source image being transformed by a wavelet-based decomposition; distributing the target distortion among the sub-bands based on energy weights of the sub-bands to produce target sub-band distortions; ascertaining, for at least four of the sub-bands, actual sub-band distortion values that result at different grades of quantization; determining quantizer values for the sub-bands based on the target sub-band distortions, including, for each of the at least four sub-bands, interpolating between at least two of the quantization grades based on at least two corresponding actual sub-band distortion values to determine a quantizer value for a current sub-band corresponding to a target sub-band distortion for the current sub-band; and quantizing the sub-bands with the determined quantizer values.

In yet another aspect, the invention can be implemented as an apparatus including a signal-capture sub-system; a quality-setting interface; and a data processing sub-system operable to perform operations including: transforming a source signal, obtained through the signal-capture sub-system, by a wavelet-based decomposition into a transformed signal including sub-bands; distributing a target distortion, obtained through the quality-setting interface, among the sub-bands based on energy weights of the sub-bands to produce target sub-band distortions; determining quantizer values for the sub-bands based on the target sub-band distortions; quantizing the sub-bands with the determined quantizer values; and compressing the quantized sub-bands to form a transformed, quantized and compressed signal. Moreover, the signal-capture sub-system can be an image-capture sub-system, and the source signal can be a source image.

The invention can be implemented to realize one or more of the following advantages. Quantizer values that produce a signal (e.g., a digital image) of a desired distortion or less (a desired quality or better) can be rapidly determined. Using scalar quantizers to reduce retained precision during signal encoding can result in faster compression to a target distortion using less memory. Moreover, by distributing the target distortion for a wavelet-transformed signal among the sub-bands in inverse proportion to their energy weights, the signals that result from decoding the transformed, quantized and compressed signal at different resolutions can all be of similar quality specified according to the target distortion for the signal overall.

The quantization techniques can be used in connection with a PCRD optimization. For example, an image can be quantized, compressed, and optimized to produce a final image of the desired distortion using less processing and/or memory resources. The wavelet sub-bands of a transformed image can be first quantized so that the quality of the resulting image is somewhat higher than a desired PSNR, the quantized image can then be compressed, and the PCRD optimization applied; thus, the output would be a rate distortion optimized codestream. The performance improvement may be especially evident when a target quality is low.

A wavelet-transformed signal (e.g., image or audio recording) can be interactively quantized and previewed to illustrate the results of various target distortion/quality settings for the signal before compression. The preview can be created very quickly because the subsequent compression (including any time consuming coding, such as entropy or arithmetic coding) and any PCRD optimization are not involved in the preview generation. Moreover, a computationally intensive portion of the process need only be performed once, and the resulting data can be used repeatedly to generate the preview interactively based on new quality settings. Input by a user of a subjective image quality measure can be mapped to a set of scalar quantizers of wavelet sub-bands of a signal to be compressed, where the scalar quantizers produce a resulting signal of the desired quality when decoded.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

In this application, the term "distortion" means a decline to a lower quality. Distortion of a signal does not necessarily indicate a misrepresentation of the signal, but rather simply indicates a partial degradation of the signal. The term "target distortion" should be understood as also encompassing a target quality, since in general, the target distortion is inversely proportional to the target quality, and either target measure can be used in various implementations. In other words, a target image quality can always be expressed numerically as a distortion.

A "digital image" is a set of electronic data, including both electronic data stored in a file and electronic data received over a network. A digital image does not necessarily correspond to a file. A digital image may be a binary digital image stored in a portion of a file that holds other images, sounds or other signals or electronic documents. A digital image may be stored in a single file dedicated to the image in question, or in a set of coordinated files. Moreover, the term "image" can refer to a whole image or a portion of an image, such as a color component of an image or a tile component of an image.

Figure 1:
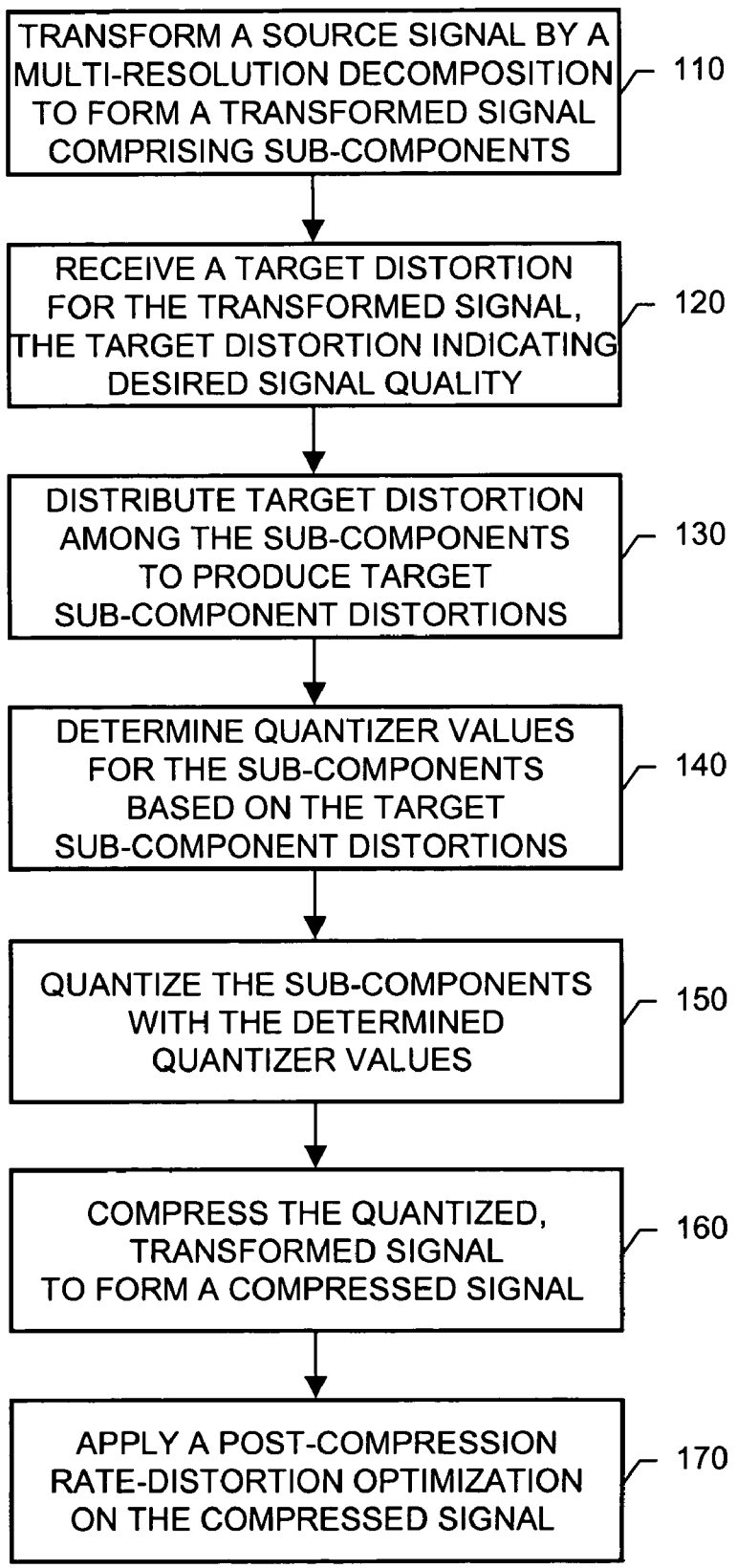
FIG. 1 is a flow chart illustrating a process of determining quantizer values and compressing a transformed signal.

FIG. 1 is a flow chart illustrating a process of determining quantizer values and compressing a transformed signal. The transformed signal can be a received signal, or a source signal can be transformed by a multi-resolution decomposition to form a transformed signal including sub-components at 110. For example, a source signal can be a digital image, or portion thereof, which is transformed by a wavelet-based, frequency-dependent, multi-resolution decomposition to create a transformed image having multiple sub-bands. The sub-bands of a wavelet-based transformed signal can represent activity of the source signal in multiple frequency bands and at multiple spatial resolutions. The obtained transformed signal (received or generated) can represent human-perceivable information, such as images or sounds, which has been transformed from a signal domain into a frequency domain.

A target distortion for the transformed signal is received at 120. The target distortion indicates desired signal quality and can be measured in various ways, such as by a peak-signal-to-noise ratio (PSNR) based on mean square error (MSE) or total squared error (TSE). The target distortion is distributed among the sub-components to produce target sub-component distortions at 130. Quantizer values are determined for the sub-components based on the target sub-component distortions at 140.

The sub-components are quantized with the determined quantizer values at 150. The quantized, transformed signal can then be compressed to form a compressed signal at 160. Moreover, a post-compression rate-distortion optimization can be applied to the compressed signal at 170. For example, this can be the post-compression rate-distortion (PCRD) optimization defined according to the JPEG 2000 specification. In the JPEG 2000 PCRD algorithm, the code blocks (which are sub-blocks from the sub-bands of the wavelet transformed image) are compressed bit plane by bit plane. Each bit plane is compressed in three passes and for each pass the distortion is calculated (i.e., what would be the net distortion if the current pass is not included in the image). Based on this calculated distortion, one or more of the three passes for each code block may be left out, and thus each code block in a sub-band can have a different amount of precision retained during the PCRD optimization (conceptually, the code blocks are quantized at the sub-bit-plane level).

Figure 2:
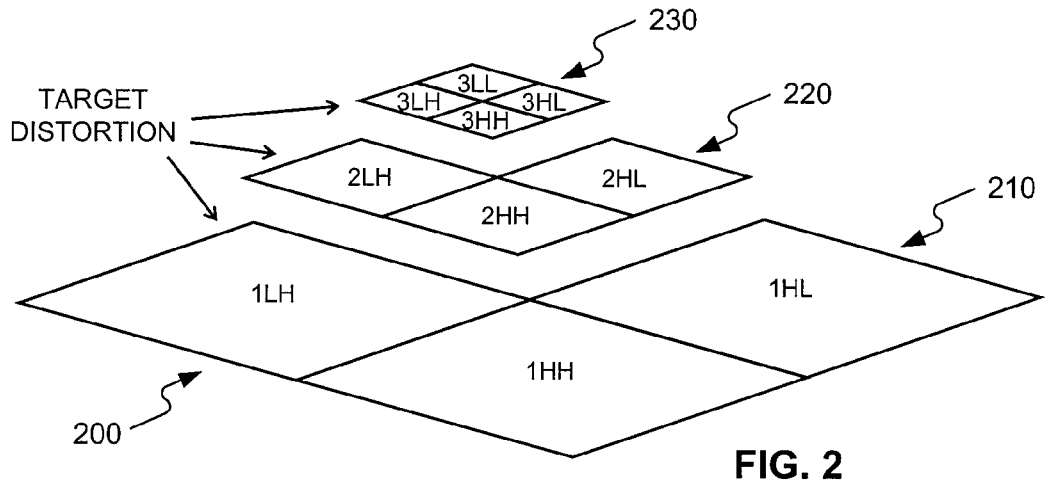
FIG. 2 is a perspective illustration of an image that has been transformed by an example wavelet-based decomposition.

FIG. 2 is a perspective illustration of an image 200 that has been transformed by an example wavelet-based decomposition. The image 200 can be a complete digital image or a portion of a digital image, such as a color component of an image or a tile of an image. The image 200 has been transformed by decomposing the source image into components (wavelet transform coefficients) in a wavelet basis with three decomposition levels, resulting in decomposition levels 210, 220 and 230, and four distinct resolution levels 0-3 (3LL being resolution level 0, level 230 being resolution level 1, level 220 being resolution level 2, and level 210 being resolution level 3). In general, an image or image component can be wavelet transformed with $N_L$ decomposition levels to create $N_L+1$ distinct resolutions. In practice, using 4-5 decomposition levels may facilitate subsequent compression of an image.

The image 200 also includes multiple sub-bands within each decomposition level. The total number of sub-bands can be given by $(3 \times N_L)+1$, and each sub-band can be labeled using a number and two letters. The number corresponds to the index level (lev) of the sub-band decomposition, and the two letters are either LL, HL, LH, or HH. The coefficients are grouped in the sub-bands depending upon the frequency and spatial orientation of the coefficients.

Thus, coefficients from sub-band b=levHL are the transform coefficients obtained from low-pass filtering vertically and high-pass filtering horizontally at decomposition level lev. Coefficients from sub-band b=levLH are the transform coefficients obtained from high-pass filtering vertically and low-pass filtering horizontally at decomposition level lev. Coefficients from sub-band b=levHH are the transform coefficients obtained from high-pass filtering vertically and high-pass filtering horizontally at decomposition level lev. Coefficients from sub-band b=$N_L$LL are the transform coefficients obtained from low-pass filtering vertically and low-pass filtering horizontally at decomposition level $N_L$.

The target distortion for the image 200 is distributed among the different resolution levels. This can involve distributing the target distortion among the sub-bands (1HH, 1LH, 1HL, 2HH, 2LH, 2HL, 3HH, 3LH, 3HL, and 3LL), based on energy weights of the sub-bands, to produce target sub-band distortions (i.e., a target distortion per sub-band). The energy weight of a sub-band is a quantity that indicates an amount of error incurred in the real domain due to a unit error in a coefficient of a sub-band in the frequency domain. Energy weights for the sub-bands can be computed in a known manner and may already be available upon receipt of the wavelet transformed signal, such as in JPEG 2000 where the image compression is based on discrete wavelet transform (DWT).

The target distortion for the image 200 can be distributed to the sub-bands in inverse proportion their energy weights, so that each sub-band has a target distortion. The target distortion indicates desired signal quality and can be measured in various ways. A useful measure of image quality/distortion is the mean square error (MSE), which is defined as follows with respect to an image. Let the image I be w pixels (i.e., picture elements) wide and h pixels high. Let $p_{ij}$ denote the value of the image pixel at location (i,j). Let I' be the image that results from decoding the lossily compressed image I. During the encoding-decoding process, the image is subjected to quantization and dequantization and consequently suffers loss of quality, since quantization can involve the replacement of each transform coefficient $C_{ij}$ with $Q_{ij}=T(C_{ij}/\Delta_{ij})$, where $\Delta_{ij}$ is a positive real number (called the quantizer or quantizer value), and T(x) is the round or floor function. Typically, the quantizers reduce the values $C_{ij}$ (maybe to zero) to enhance the compression.

MSE is a metric that directly assesses the extent of loss of quality. Letting $p'_{ij}$ denote the value of the pixel at location (i,j) in the decoded image I', MSE is defined as follows:

$$TSE = \sum_{i=1}^{h} \sum_{j=1}^{w} (p_{ij} - p'_{ij})^2, \quad (1)$$

$$MSE = TSE/wh. \quad (2)$$

The MSE metric is dependent on the size and bit depth of the image. In order to normalize the distortion metric, PSNR can be used. This distortion/quality metric can be defined as:

$$PSNR = -20 \log_{10}(1/2^d \sqrt{(D/wh)}), \quad (3)$$

where d is the bit depth of the image, and D is the distortion, which can be MSE, TSE, or any other additive distortion measure (e.g., a visually weighted MSE or TSE). Use of this form of distortion metric can make the metric appear to match more closely the subjective human perception of distortion in an image.

PSNR is a quality measure based on MSE, and thus, a target PSNR can be readily converted to a target MSE. Moreover, other perceptual distortion metrics based on MSE are also possible. These can include weighted MSE metrics that weight the distortion contribution of each pixel in terms of its contribution to the subjective perception of loss in quality.

Based on the target sub-band distortions, quantizer values can be found for the sub-bands such that a quantizer for a sub-band produces in that sub-band, at most, the target sub-band distortion. The quantizer, $\Delta_b$, for a sub-band, b, can be computed by assuming that each coefficient of the sub-band incurs a quantization error of $N \times \Delta_b$, where N is a parameter (e.g., 0.5) that is defined such that a total distortion, after quantization of all the sub-bands using the determined quantization values, is necessarily less than or equal to the target distortion for the image 200.

Figure 3:
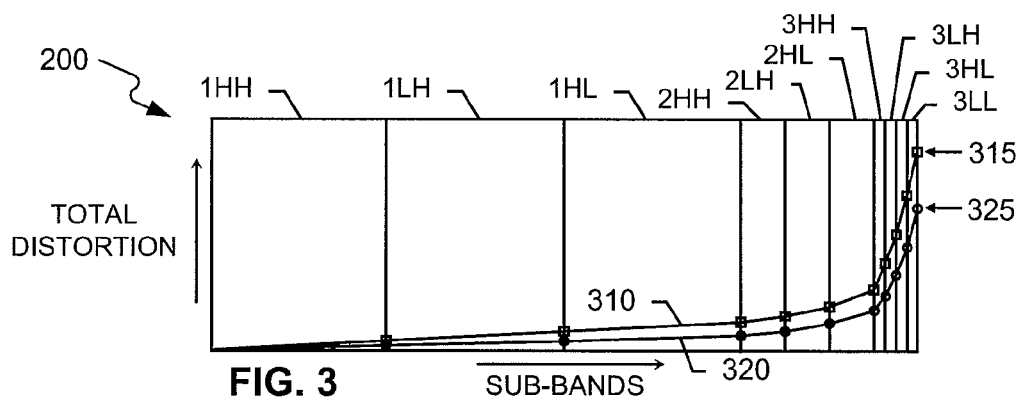
FIG. 3 illustrates distortion approximation for the example image of FIG. 2.

FIG. 3 illustrates distortion approximation for the example image 200 of FIG. 2. The sub-bands (1HH, 1LH, 1HL, 2HH, 2LH, 2HL, 3HH, 3LH, 3HL, and 3LL) are presented in the form of a graph. The x-axis of this graph represents the picture elements (the transform coefficients) of the sub-bands presented in an order starting at a highest resolution level and ending at a lowest resolution level of the sub-bands (the width of a sub-band in FIG. 2 thus indicates resolution of that sub-band). The y-axis of this graph represents the cumulative distortion for the image 200 as the per-sub-band distortions are added in, going from left to right. The graph does not represent any particular units, nor does it correspond to a specific distorted image, but rather just illustrates the distortion approximation.

A first plot 310 illustrates the cumulative target distortion for the sub-bands. A second plot 320 illustrates the cumulative actual distortion for the sub-bands. As shown, the quantizers can be selected for the sub-bands such that the incremental distortion introduced by each sub-band after quantization is necessarily less than the target sub-band distortion. This then guarantees that the total actual distortion 325 for the image 200 will be less than the target distortion 315 (e.g., that the resulting PSNR for the image 200 will be higher than the desired PSNR). Other approaches to ensure the total distortion 325 ends up being less than or equal to the target distortion 315 are also possible.

The sub-bands can be numbered from 1 to $NB=(3 \times N_L)+1$, with the innermost sub-band being numbered 1, and the outermost sub-band being numbered NB. The innermost sub-band is the final low resolution, low frequency band that results after $N_L$ levels of wavelet decomposition (e.g., sub-band 3LL in FIGS. 2-3), and the outermost sub-band is the high resolution, high frequency band that results from the first level of wavelet decomposition (e.g., sub-band 1HH in FIGS. 2-3).

Letting $S_l$ denote the set of sub-bands that contribute to a given resolution level l, $\gamma_b$ can denote the energy weight of sub-band b, and D can denote the target distortion. The target sub-band distortion $D_b$ that contributes to the total distortion D can be determined according to the following equation:

$$D_b = \left(\frac{1}{\gamma_b}D\right) \bigg/ \left(\sum_{i=1}^{NB} 1/\gamma_i\right). \quad (4)$$

The summation term serves as a normalizing factor for the per-sub-band target distortion.

The quantizer $\Delta_b$ for sub-band b can be computed by assuming that each coefficient in the sub-band suffers a quantization error of $\alpha_b \Delta_b / 2$, where $\alpha_b$ is a parameter that may vary with the sub-bands or be a fixed value for all the sub-bands. For example, $\alpha_b$ can be a parameter that is determined empirically or heuristically.

Using this assumption about incurred quantization error, the target sub-band distortion $D_b$ can be expressed as follows:

$$D_b = (\gamma_b \alpha_b^2 \Delta_b^2 n_b)/4, \quad (5)$$

where $n_b$ is the number of samples in sub-band b, which can be computed as the width times height of sub-band b. Solving for $\Delta_b$ and substituting the value of $D_b$ from equation (4), results in:

$$\Delta_b = \frac{2}{\alpha_b \gamma_b} \sqrt{\frac{D}{n_b \sum_{i=1}^{NB} 1/\gamma_i}}. \quad (6)$$

A fixed value of $\alpha_b=0.4$ for all sub-bands has been determined to yield very good results in the medium PSNR range (28 to 40 db). If $\alpha_b$ is set to 1 for all sub-bands, then this results in an upper bound on the distortion resulting from quantization equal to the target distortion, thus ensuring the target distortion is not exceeded (i.e., a lower bound on the target quality). When $\alpha_b$ is set to 0.4 for all sub-bands, this results in an upper bound distortion less than or equal to the target distortion at the low to medium target PSNR range.

Thus, this represents a low complexity approach to determining quantizer values that result in an image that is close to the desired distortion and guaranteed to not have a distortion worse than the target. This approach can be used either independently or as a preprocessing operation before PCRD optimization. Quantizing wavelet sub-bands of a wavelet-transformed image in this manner, when used in connection with PCRD optimization in a compression scheme, can reduce the amount of time spent in compressing unnecessary bit planes that the PCRD optimization will essentially discard anyway.

As an alternative to the above approach to determining the quantizers, instead of relying on models of the behavior of the distortion with respect to the quantizer, actual distortion values can be computed at various grades of quantization (i.e., at certain fixed quantizer values). Then, the quantizer value for a sub-band can be determined by interpolating between at least two of the quantization grades. For example, the quantization grades can correspond to exponential powers of two, the actual sub-band distortion values can be ascertained by calculating the distortion resulting from removal of one or more least-significant bit planes in binary data making up the sub-band (the distortion can be measured by squared error calculations), and then interpolation can be used to find the quantizer corresponding to the target sub-band distortion.

Figure 4:
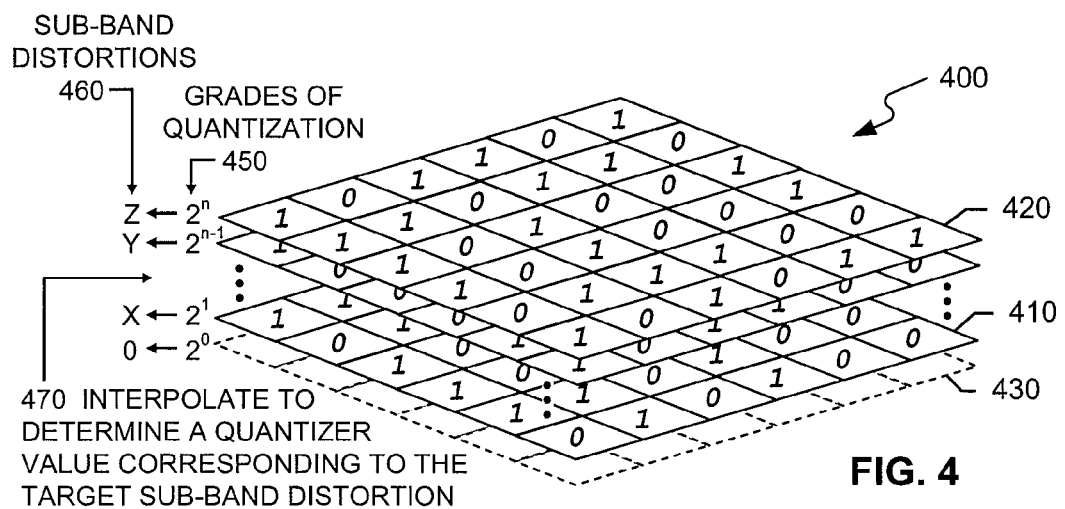
FIG. 4 is a perspective illustration of ascertaining actual distortion values that result at different grades of quantization by removal of bit planes in a sub-band, and interpolating to determine a quantizer value corresponding to a target sub-band distortion.

FIG. 4 is a perspective illustration of ascertaining actual distortion values that result at different grades of quantization by removal of bit planes in a sub-band, and interpolating to determine a quantizer value corresponding to the target sub-band distortion. A sub-band 400 is a two dimensional data set of binary numbers. This two dimensional data set can be viewed as a stack of bit planes, including a least-significant bit plane 410 and a most-significant bit plane 420. The stack of bit planes has a height n, which is the bit depth of the data set, and the grades of quantization 450 correspond to two-to-the-power of the bit plane number. Note that the grades of quantization 450 can include a quantizer of one, which corresponds to a conceptual zero$^{th}$ bit plane 430.

Two or more actual sub-band distortion values 460 can be ascertained according to the results of removing a set of corresponding least-significant bit planes. This can include ascertaining the actual distortion resulting from removal of the zero$^{th}$ bit plane 430, which is zero distortion (i.e., the two or more actual sub-band distortion values 460 to be interpolated between can include a distortion of zero corresponding to no quantization being performed). Thus, as illustrated, a distortion value of 0 corresponds to the quantizer $2^0$, a distortion value X corresponds to the quantizer $2^1$, a distortion value Y corresponds to the quantizer $2^{n-1}$, and a distortion value Z corresponds to the quantizer $2^n$.

The interpolation 470 then determines a quantizer value corresponding to the target sub-band distortion, which falls between at least two actual sub-band distortion values 460. In some sub-bands though, the interpolation 470 may turn out to be unneeded. The target sub-band distortion may be greater than what can be provided by the current sub-band, or the target sub-band distortion may be less than what can be provided. The latter can happen when a subset of the bit planes are removed from consideration altogether, as when the coefficients are truncated even before quantization, and thus the minimum distortion the sub-band can provide is greater than zero.

The data in the bit planes can be integer representations of fractional values, and a certain number of fractional bits can be disregarded (truncated). The number of bit planes to consider for possible use in interpolation can be decided by setting how many fractional bits to keep (which can change the least-significant bit plane 410 to another bit plane higher in the stack), and determining the maximum number of bits obtainable from all the coefficients in the sub-band (which can change the most-significant bit plane 420 to another bit plane lower in the stack). The resulting bit planes can be a set of bit planes taken from the middle of the full stack of bit planes in the sub-band 400, and because fractional values are represented by the bits making up the coefficients, the powers-of-two quantizers can be negative powers of two, such as $2^{-3}$=0.125. Details of interpolation in the context of fractional values is described further below. Additionally, it should be appreciated that the techniques described are not limited to operating on bit planes, and can be applied to bit levels of data generally, such as removal of least-significant bit lines in a one dimensional signal (e.g., an audio channel signal), or removal of least-significant bit cubes in a three dimensional signal.

The number of actual sub-band distortion values 460 to calculate can be preset or determined on the fly based on input parameters and/or the image data. For example, in one implementation, the number of bits $n_f$ that are considered in the fractional parts of each coefficient of a sub-band can be fixed for each sub-band. That is, the coefficients of the sub-band can be truncated after $n_f$ fractional binary digits. Let $n_s$ be the number of binary digits in the integer part of the magnitude of the largest coefficient in the sub-band. Thus, in FIG. 4, the least-significant bit plane 410 would now be bit plane $-n_f$, and the most-significant bit plane 420 would now be bit plane $n_s$.

The distortion that results if the sub-band is quantized with a quantizer value $2^m$ can be calculated, where m ranges from $-n_f$ to $n_s+1$. Thus, computing the actual distortions can involve calculating the distortion that occurs if, one by one, each least significant bit plane is removed from each coefficient, and an all-zero bit plane inserted in its stead (the calculated distortion can be squared errors, which is the square of the differences between the coefficients before and after zeroing of a bit plane). For a fixed quantizer $\Delta$, the formula for computing the quantization error (distortion) can be given by:

$$D_\Delta = \gamma_b \sum_{i \in b} \left( c_i - \left\lfloor \frac{c_i}{\Delta} \right\rfloor \Delta - \frac{\Delta}{2} \right)^2, \tag{7}$$

where the sum runs over all the wavelet coefficients c in sub-band b.

Thus, real data can be generated regarding the behavior of the distortion curve with respect to the quantizer value, which can be tabulated as a set of tuples $(d_m, 2^m)$, where $d_m$ is the distortion incurred due to a quantizer equal to $2^m$, and m ranges from $-n_f$ to $n_s+1$. For values of the distortion d that lie between $d_m$ and $d_{m+1}$, interpolation can be used to predict the value of the quantizer.

The interpolation scheme can be any appropriate interpolation, such as linear or quadratic interpolation. For example, a quadratic of the form $d = a\Delta_b^2 + c$ can be used. The values of the constants a and c can be determined from the endpoints. In particular, if the desired distortion d lies between $d_m$ and $d_{m+1}$, the equation for the quantizer corresponding to d can be given by:

$$\Delta_d = 2^m \sqrt{\frac{3d - 4d_m + d_{m+1}}{d_{m+1} - d_m}}. \tag{8}$$

Another option for interpolation is to use a quadratic of the form $d = a\Delta_b^2 + \beta\Delta_b + c$. Then to determine the constants a, $\beta$ and c, three points $d_{m-1}$, $d_m$ and $d_{m+1}$ are considered.

If the target distortion d is less than $d_{-n_f}$, then $d_{-n_f}$ can be chosen as the distortion for the sub-band, and $2^{-d_f}$ is the quantizer. Similarly, if d is greater than $d_{n_s+1}$, $d_{n_s+1}$ can be chosen as the distortion, and $2^{n_s+1}$ is the quantizer. In both of these cases, there remains an unsatisfied portion (positive or negative) of the target distortion d. This unsatisfied portion of the target for the sub-band can be redistributed to other sub-bands. Thus, the amount of error incurred in not catering to the target distortion in the current sub-band can be adjusted for in other sub-bands. This redistribution of target distortion among the sub-bands can be separate from, or integrated with the original distribution of target distortion to the sub-bands. For example, the distribution of target distortion, determination of quantizer values, and redistribution of target distortion can all be implemented together as a set of nested procedures as outlined below.

Figure 5:
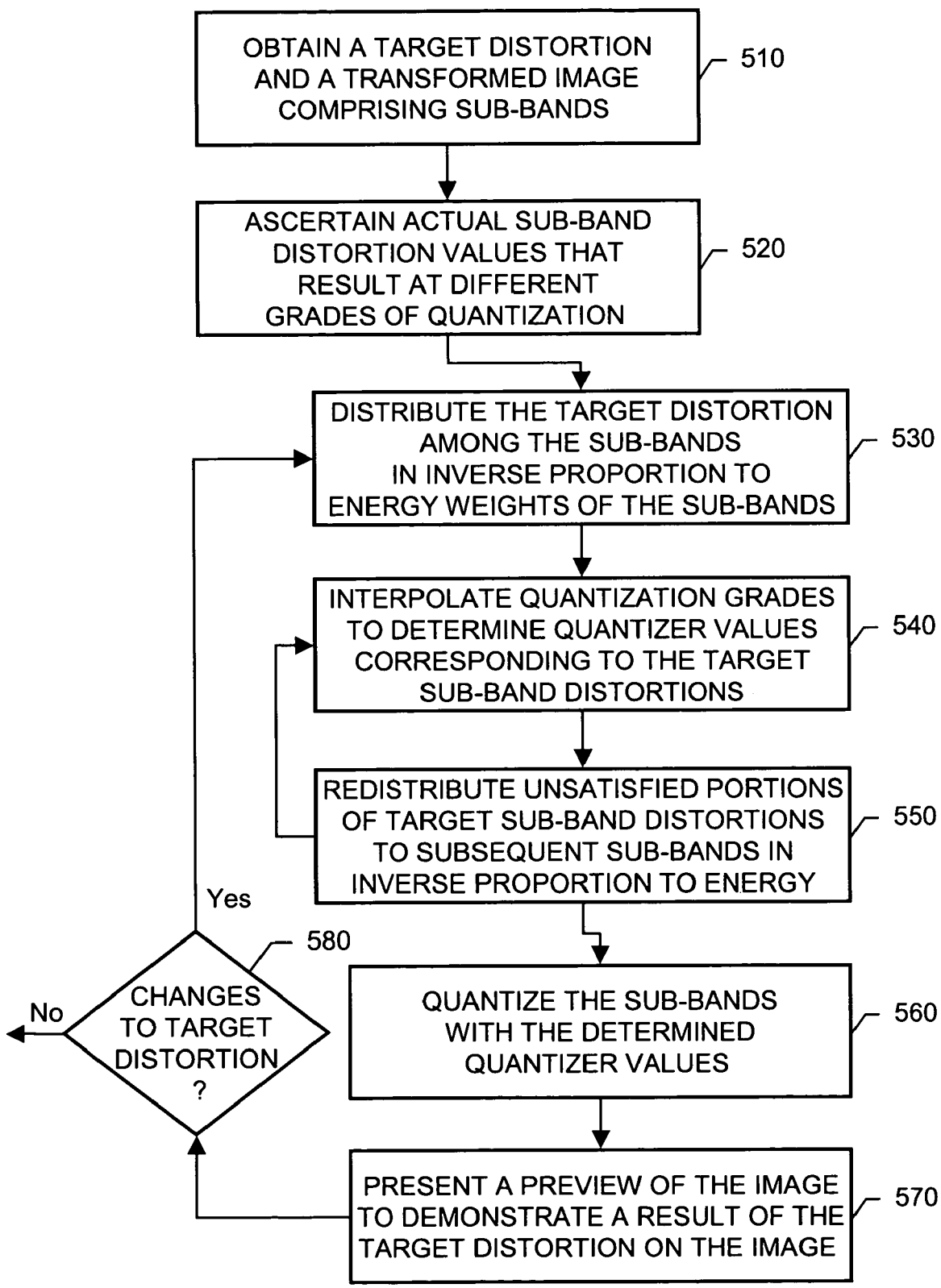
FIG. 5 is a flow chart illustrating a process of determining quantizer values for an image presented in a preview mode.

FIG. 5 is a flow chart illustrating a process of determining quantizer values for an image presented in a preview mode. A target distortion and a transformed image including sub-bands are obtained at 510. These can be received and/or generated as discussed above. Actual sub-band distortion values that result at different grades of quantization are ascertained at 520. For example, the distortion that results in a sub-band as each successive bit plane is removed, from the least-significant bit plane to the most-significant bit plane, can be calculated and tabulated with the corresponding power-of-two quantizers.

This computation of the quantizer versus distortion curve is a more computationally intensive portion of the process, and it can be modified when needed to decrease the number of grades of quantization at which the actual distortion is determined. For example, the distortion may be computed at just two points, the largest distortion corresponding to a quantizer that is equal to the largest coefficient of the sub-band, and the minimum distortion corresponding to a quantizer that is smaller than the smallest coefficient (the minimum distortion may even be set to zero). These quantities can be determined very rapidly, and quadratic interpolation can be used for the values in-between the two extreme values. Additionally, the distortion may be found at a few more points between the extremes and piecemeal quadratic interpolation can be used for the other values.

While the computation of the quantizer versus distortion curve is a more computationally intensive portion of the process, it is also a portion that needs to be performed only once for a given image. Once determined, the curve can be saved and used in response to a change in target distortion, such as may be made by a user. This can be particularly useful if the compression system provides an interactive preview to help the user select the quality level to his liking.

The target distortion is distributed among the sub-bands in inverse proportion to energy weights of the sub-bands to produce target sub-band distortions at 530. Interpolation between quantization grades is performed to determine quantizer values corresponding to the target sub-band distortions at 540. Unsatisfied portions of target sub-band distortions are redistributed to subsequent sub-bands in inverse proportion to energy weights of the subsequent sub-bands at 550. The operations 530, 540, 550 can be integrated and performed together.

The distribution/redistribution and interpolation to find quantizers can interact in a common process to determine the quantizers to use. The target distortion for the signal can be distributed among the sub-bands in the inverse ratio to their energy weights. This distribution can be done for sub-bands that contribute to one resolution level at a time, and moving from the outermost level towards the innermost level, such that any errors incurred in one level is compensated for in the subsequent levels. Such error is incurred if the distortion asked for is larger than the largest possible distortion or smaller than the smallest possible distortion for the sub-band. Once the distortion that will be contributed by a sub-band is identified, the quantizer that will produce this amount of distortion can be read off or computed by interpolation.

What follows is a detailed example of the techniques described, including pseudo code subject to the following stipulations: the distortions $d_m$ are stored in an array $\vec{d}$, which is indexed by numbers $-n_f$ to $n_s+1$; let $D_b^{max} = \vec{d}[n_s+1]$ and $D_b^{min} = \vec{d}[-n_f]$; let the quantizers corresponding to $D_b^{max}$ and $D_b^{min}$ be $\Delta_b^{max}$ and $\Delta_b^{min}$ respectively. A procedure called Find-Quantizer takes as arguments a target distortion $D_b^{ask}$ for the sub-band and the index b of the sub-band, and returns a tuple $(D_b^{ret}, \Delta_b)$, whose values are the distortion and the quantizer found.

Find-Quantizer($D_b^{ask}$, b)
if ($D_b^{min} \leq D_b^{ask} \leq D_b^{max}$) then
Find m such that $\vec{d}[m] \leq D_b^{ask} \leq \vec{d}[m+1]$ $$\Delta_b \leftarrow 2^m \sqrt{\frac{3D_b^{ask} - 4d_m + d_{m+1}}{d_{m+1} - d_m}}$$

return $(D_b^{ask}, \Delta_b)$
if ($D_b^{ask} < D_b^{min}$) then
return $(D_b^{max}, \Delta_b^{min})$
if ($D_b^{ask} > D_b^{max}$) then
return $(D_b^{max}, \Delta_b^{max})$ As discussed above, determining the quantizer versus distortion curve is a more computationally intensive portion of the process. The computational costs can be reduced at the expense of a slight reduction in accuracy if desired, and this can be reflected in the Find-Quantizer procedure.

For example, the process may only determine $(D_b^{max}, \Delta_b^{max})$ and $(D_b^{min}, \Delta_b^{min})$ explicitly and for other values in-between quadratic interpolation of the form $d = a\Delta_b^2 + c$ may be used, as described above. Or the process may determine $(D_b^{max}, \Delta_b^{max})$ and $(D_b^{min}, \Delta_b^{min})$ and a few more points in-between explicitly and then perform piecewise quadratic interpolation for the remaining points. Experiment has shown that the behavior of the quantizer versus distortion curve often varies at high and low distortions. Where distortion is to be explicitly found at an intermediate value, $(d_{n_{s-1}}, s^{n_{s-1}})$ may be a good choice for the intermediate value. Quadratic interpolation of the form $d = a\Delta_b^2 + c$ or $d = a\Delta_b^2 + \beta\Delta_b + c$ can also be used. Such changes to the Find-Quantizer procedure can affect the formula for obtaining $\Delta_b$ and the size of the array d.

During determination of the distortion contributions of the sub-band, errors incurred in one level can be compensated for in the subsequent levels. An error is incurred if the distortion asked of a sub-band, $D_b^{ask}$, cannot be met, and the Find-Quantizer procedure returns a distortion $D_b^{ret}$ that is different than $D_b^{ask}$. The difference $D_b^{ask} - D_b^{ret}$ can be accumulated for each sub-band of a level l in a variable called balance. When moving to the next level, the target distortion for a sub-band can be modified as follows:

Find-Distortion-Proportion($D^T$, b, l, balance)
% This procedure takes target image distortion $D^T$, the sub-band index b, the resolution
% level l, and the balance distortion from previous levels that needs to be compensated
% for in the current level. The procedure returns the contribution of distortion that
% needs to be allocated to sub-band b.

$$D_b^{ask} \leftarrow \frac{\frac{1}{\gamma_b} D^T}{\sum_{i=1}^{NB} 1/\gamma_b} + \frac{\frac{1}{\gamma_b} \text{balance}}{\sum_{b=1}^{3l+1} 1/\gamma_b}$$

return $D_b^{ask}$

Additionally, a distortion distribution procedure can be defined as follows:

Allocate-Distortion($D^T$, NL)
% This procedure takes target image distortion $D^T$ and the number of levels of % of decomposition NL, and computes the amount of distortion $D_b$ to be allocated
% to each sub-band b, and the quantizer $\Delta_b$ corresponding to it.
  balance←0
  distloss←0
  for l←NL to 0 {
    for each sub-band b∈$S_l$ {
      $D_b^{ask}$←Find-Distortion-Proportion($D^T$, b, l, balance)
      ($D_b^{ret}$,$\Delta_b$)←Find-Quantizer($D_b^{ask}$, b)
      distloss←distloss+($D_b^{ask}$−$D_b^{ret}$)
    }
    balance←distloss
    distloss←0
  }

After the quantizers have been determined, the sub bands are quantized with the determined quantizer values at 560. A preview of the quantized image can be presented to demonstrate a result of the target distortion on the image at 570. If changes to the target distortion for the image are received at 580, the new target distortion is distributed and new quantizers determined as described. Otherwise, additional operations, such as compression, can be performed.

Figure 6:
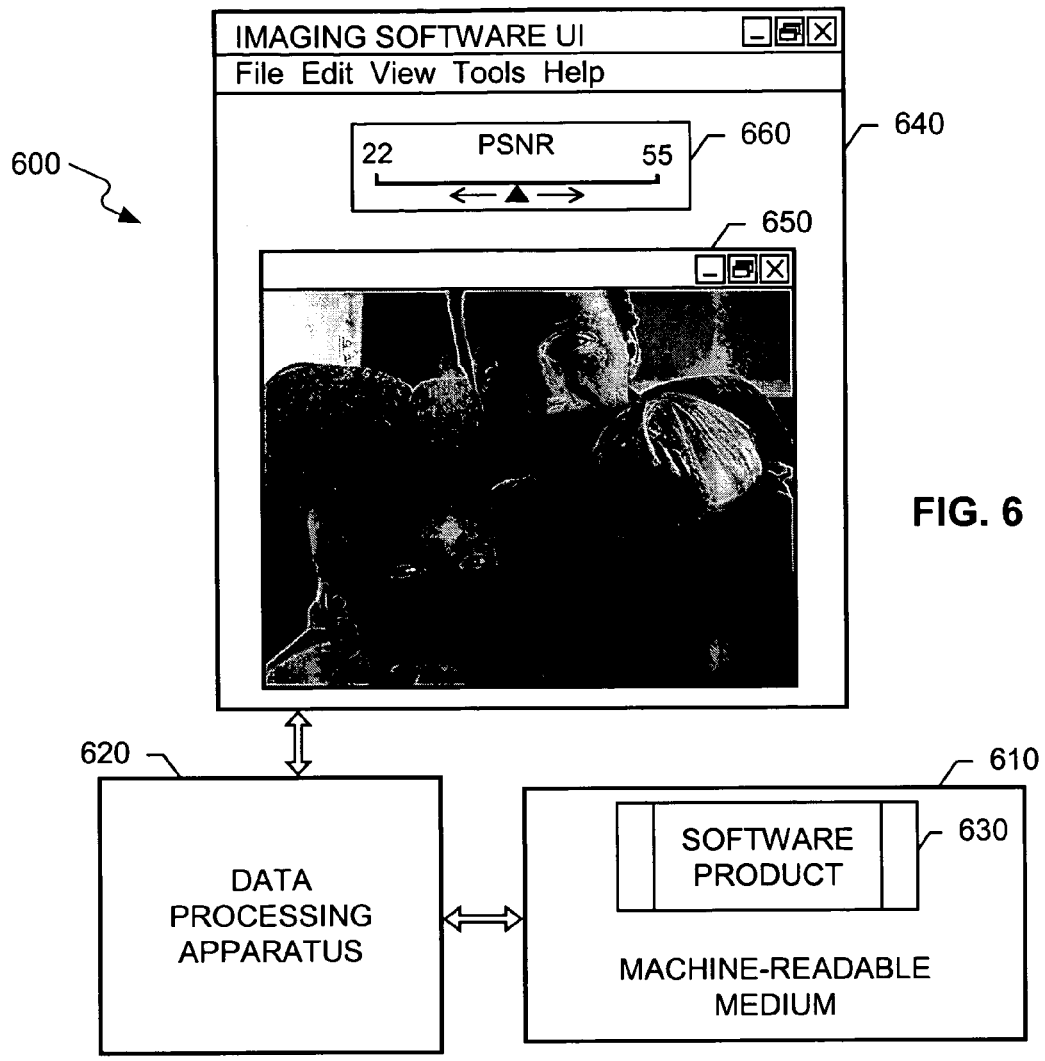
FIG. 6 is a block diagram illustrating an example system employing the described techniques.

FIG. 6 is a block diagram illustrating an example system 600 employing the described techniques. A machine-readable medium 610 (e.g., a storage device) tangibly embodies a software product 630 including instructions operable to cause a data processing apparatus 620 to present an imaging software user interface (UI) 640 and to perform the operations described. In the imaging software UI 640, an image can be presented in a first window/panel 650, and a distortion adjustment interface can be presented in a second window/panel 660. The distortion adjustment interface can be a slider interface as shown, or other interfaces.

The distortion adjustment interface allows a user to readily define the image quality, and a preview of the resulting image can be rapidly presented using the quantization techniques described. In an interactive preview, where a user sees how the resulting image will look after a change in the quality setting, the actual distortion values only need to be computed once. For each subsequent change to the target distortion, interpolation among the already determined actual distortion values can rapidly provide the new quantizers for the new target distortion.

The image quality can be defined directly using an appropriate PSNR range in the interface. For example, a PSNR range of 22-55 works well for many images. Another way of defining image quality is to specify a "quality number" within a fixed range (e.g., 1-100), which can then be mapped to a quality/distortion value in a fixed range (e.g., a PSNR value in the range 22-55). Other measures can be used to specify quality/distortion, and such measures can be mapped to a distortion measure used by the system 600. As image quality can be a subjective assessment that may vary with the nature of the image, PSNR may be better at describing this subjective aspect of an image across all possible images.

The invention and all of the functional operations described in this specification can be implemented in digital electronic circuitry, or in computer hardware, firmware, software, or in combinations of them, such as the structural means disclosed in this specification and structural equivalents thereof. Apparatus of the invention can be implemented as one or more computers located in one or more places. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and optical disks, such as CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

Figure 7:
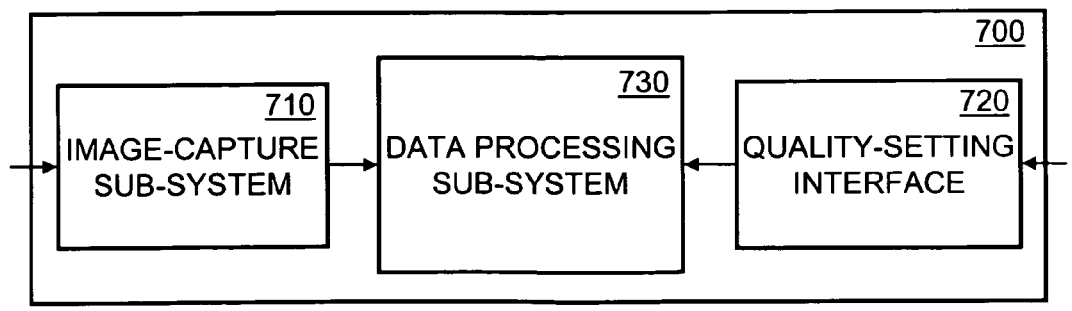
FIG. 7 is a block diagram illustrating a consumer electronic device.

The invention can be implemented as an apparatus having one or more specific applications, rather than a general purpose data processing system. For example, the invention can be implemented in a consumer electronic device having a digital camera function. FIG. 7 is a block diagram illustrating a consumer electronic device 700. The device 700 includes an image-capture sub-system 710, which can include an optical assembly and an active pixel sensor (APS) array, charge-coupled device (CCD) or other image capture device used to obtain an image. A quality-setting interface 720 can be a physical switch or software-based interface in the device 700, which is used to obtain a target distortion. Additionally, the device 700 includes a data processing sub-system 730, which can perform the operations described above. The data processing sub-system 730 can be implemented in digital electronic circuitry, in hardware, firmware, software, or in combinations of them, as described above.

The invention has been described in terms of particular embodiments. Other embodiments are within the scope of the following claims. For example, the operations of the invention can be performed in a different order and still achieve desirable results. Moreover, the invention can be applied in various compression systems that include wavelet transforms, frequency-dependent signal decomposition, and/or multi-resolution signal decomposition.

What is claimed is:

1. A method comprising:

obtaining a target distortion and a transformed signal, the target distortion indicating desired signal quality, and the transformed signal comprising sub-components resulting from a source signal being transformed by a multi-resolution decomposition;

distributing the target distortion among the sub-components to produce target sub-component distortions;

determining quantizer values for the sub-components based on the target sub-component distortions; and quantizing the sub-components with the determined quantizer values;

wherein the distributing, the determining and the quantizing are performed using one or more processors;

wherein the sub-components comprise sub-bands resulting from the source signal being transformed by a wavelet-based, frequency-dependent, multi-resolution decomposition, the target sub-component distortions comprise target sub-band distortions, and distributing the target distortion comprises distributing the target distortion among the sub-bands based on energy weights of the sub-bands;

the method further comprising ascertaining actual sub-band distortion values that result at different grades of quantization in a current sub-band, wherein determining quantizer values comprises: if a target sub-band distortion for the current sub-band falls between at least two of the actual sub-band distortion values determined for the current sub-band, interpolating between at least two of the quantization grades based on the at least two actual sub-band distortion values to determine a quantizer value for the current sub-band corresponding to the target sub-band distortion for the current sub-band; and wherein distributing the target distortion comprises distributing the target distortion among the sub-bands in inverse proportion to the energy weights of the sub-bands, and determining quantizer values further comprises:

determining quantizer values for the sub-bands starting at a highest resolution level and ending at a lowest resolution level of the sub-bands, and if one or more sub-bands of a current resolution level cannot satisfy one or more corresponding target sub-band distortions, redistributing an unsatisfied portion of the one or more corresponding target sub-band distortions to target sub-band distortions for lower resolution sub-bands in inverse proportion to energy weights of the lower resolution sub-bands.

2. The method of claim 1, further comprising removing one or more least-significant bit levels in binary sub-band data to produce at least one of the different grades of quantization corresponding to exponential-powers-of-two quantizers.

3. The method of claim 1, further comprising:

presenting a preview of the quantized, transformed signal to demonstrate a result of the target distortion on the transformed signal; and repeating the distributing, determining, quantizing and presenting operations, but not the ascertaining operation, in response to a change in the target distortion.

4. The method of claim 1, further comprising:

compressing the quantized, transformed signal to form a compressed signal; and applying a post-compression rate-distortion optimization on the compressed signal.

5. A software product tangibly embodied in a computer-readable medium, the software product comprising instructions operable to cause data processing apparatus to perform operations comprising:

obtaining a target distortion and a transformed signal, the target distortion indicating desired signal quality, and the transformed signal comprising sub-components resulting from a source signal being transformed by a multi-resolution decomposition;

distributing the target distortion among the sub-components to produce target sub-component distortions;

determining quantizer values for the sub-components based on the target sub-component distortions; and quantizing the sub-components with the determined quantizer values;

wherein the sub-components comprise sub-bands resulting from the source signal being transformed by a wavelet-based, frequency-dependent, multi-resolution decomposition, the target sub-component distortions comprise target sub-band distortions, and distributing the target distortion comprises distributing the target distortion among the sub-bands based on energy weights of the sub-bands;

wherein the operations further comprise ascertaining actual sub-band distortion values that result at different grades of quantization in a current sub-band, and wherein determining quantizer values comprises: if a target sub-band distortion for the current sub-band falls between at least two of the actual sub-band distortion values determined for the current sub-band, interpolating between at least two of the quantization grades based on the at least two actual sub-band distortion values to determine a quantizer value for the current sub-band corresponding to the target sub-band distortion for the current sub-band; and wherein distributing the target distortion comprises distributing the target distortion among the sub-bands in inverse proportion to the energy weights of the sub-bands, and determining quantizer values further comprises:

determining quantizer values for the sub-bands starting at a highest resolution level and ending at a lowest resolution level of the sub-bands, and if one or more sub-bands of a current resolution level cannot satisfy one or more corresponding target sub-band distortions, redistributing an unsatisfied portion of the one or more corresponding target sub-band distortions to target sub-band distortions for lower resolution sub-bands in inverse proportion to energy weights of the lower resolution sub-bands.

6. The software product of claim 5, wherein the operations further comprise removing one or more least-significant bit levels in binary sub-band data to produce at least one of the different grades of quantization corresponding to exponential-powers-of-two quantizers.

7. The software product of claim 6, wherein the transformed signal comprises a two-dimensional data set, and removing one or more least-significant bit levels comprises removing one or more least-significant bit planes.

8. The software product of claim 5, wherein the operations further comprise:

presenting a preview of the quantized, transformed signal to demonstrate a result of the target distortion on the transformed signal; and repeating the distributing, determining, quantizing and presenting operations, but not the ascertaining operation, in response to a change in the target distortion.

9. The software product of claim 5, wherein interpolating comprises employing quadratic interpolation.

10. The software product of claim 5, wherein the operations further comprise:
- compressing the quantized, transformed signal to form a compressed signal; and
- applying a post-compression rate-distortion optimization on the compressed signal.

11. The software product of claim 5, wherein obtaining the target distortion comprises generating a target peak-signal-to-noise ratio from a received quality measure.

12. The software product of claim 5, wherein obtaining the transformed signal comprises receiving at least a portion of a digital image.

13. A method comprising:
- obtaining a target distortion and a signal, the target distortion indicating desired signal quality;
- ascertaining actual distortion values that result at different grades of quantization of the signal;
- interpolating between at least two of the quantization grades based on at least two of the actual distortion values to determine a quantizer value corresponding to the target distortion;
- quantizing the signal with the determined quantizer value;
- presenting a preview of the quantized signal to demonstrate a result of the target distortion on the signal; and
- repeating the interpolating, quantizing and presenting operations, but not the ascertaining operation, in response to a change in the target distortion;
- wherein the interpolating, the quantizing, the presenting and the repeating are performed using one or more processors.

14. The method of claim 13, further comprising removing one or more least-significant bit levels in binary signal data to produce at least one of the different grades of quantization corresponding to exponential-powers-of-two quantizers.

15. The method of claim 13, wherein the signal comprises a first sub-band of a larger transformed signal comprising multiple sub-bands, including the first sub-band, resulting from a source signal being transformed by a wavelet-based decomposition, and obtaining the target distortion for the first sub-band comprises:
- receiving a larger target distortion for the larger transformed signal; and
- distributing the larger target distortion among the multiple sub-bands to produce target sub-band distortions, including the target distortion for the first sub-band.

16. The method of claim 15, wherein distributing the larger target distortion comprises distributing the larger target distortion among the multiple sub-bands based on energy weights of the multiple sub-bands.

17. The method of claim 16, further comprising redistributing an unsatisfied portion of a target sub-band distortion for a current sub-band to subsequent sub-bands based on energy weights of the subsequent sub-bands.

18. The method of claim 13, further comprising:
- compressing the quantized, transformed signal to form a compressed signal; and
- applying a post-compression rate-distortion optimization on the compressed signal.

19. A software product tangibly embodied in a computer-readable medium, the software product comprising instructions operable to cause data processing apparatus to perform operations comprising:
- obtaining a target distortion and a signal, the target distortion indicating desired signal quality;
- ascertaining actual distortion values that result at different grades of quantization of the signal;
- interpolating between at least two of the quantization grades based on at least two of the actual distortion values to determine a quantizer value corresponding to the target distortion;
- quantizing the signal with the determined quantizer value;
- presenting a preview of the quantized signal to demonstrate a result of the target distortion on the signal; and
- repeating the interpolating, quantizing and presenting operations, but not the ascertaining operation, in response to a change in the target distortion.

20. The software product of claim 19, wherein the operations further comprise removing one or more least-significant bit levels in binary signal data to produce at least one of the different grades of quantization corresponding to exponential-powers-of-two quantizers.

21. The software product of claim 20, wherein the signal comprises a two-dimensional data set, and removing one or more least-significant bit levels comprises removing one or more least-significant bit planes.

22. The software product of claim 19, wherein the signal comprises a first sub-band of a larger transformed signal comprising multiple sub-bands, including the first sub-band, resulting from a source signal being transformed by a wavelet-based decomposition, and obtaining the target distortion for the first sub-band comprises:
- receiving a larger target distortion for the larger transformed signal; and
- distributing the larger target distortion among the multiple sub-bands to produce target sub-band distortions, including the target distortion for the first sub-band.

23. The software product of claim 22, wherein distributing the larger target distortion comprises distributing the larger target distortion among the multiple sub-bands based on energy weights of the multiple sub-bands.

24. The software product of claim 23, wherein the operations further comprise redistributing an unsatisfied portion of a target sub-band distortion for a current sub-band to subsequent sub-bands based on energy weights of the subsequent sub-bands.

25. The software product of claim 19, wherein the operations further comprise:
- compressing the quantized, transformed signal to form a compressed signal; and
- applying a post-compression rate-distortion optimization on the compressed signal.

26. The software product of claim 19, wherein interpolating comprises employing quadratic interpolation.

27. The software product of claim 19, wherein obtaining the target distortion comprises generating a target peak-signal-to-noise ratio from a received quality measure.

28. The software product of claim 19, wherein obtaining the signal comprises receiving at least a portion of a digital image.

29. A system comprising:
- a data processing apparatus; and
- a machine-readable medium tangibly embodying a software product comprising instructions operable to cause the data processing apparatus to present an imaging software user interface and to perform operations comprising:
  - obtaining a target distortion and a transformed image, the target distortion indicating desired image quality, and the transformed image comprising sub-bands resulting from a source image being transformed by a wavelet-based decomposition;

distributing the target distortion among the sub-bands based on energy weights of the sub-bands to produce target sub-band distortions;

ascertaining, for at least four of the sub-bands, actual sub-band distortion values that result at different grades of quantization;

determining quantizer values for the sub-bands based on the target sub-band distortions, including, for each of the at least four sub-bands, interpolating between at least two of the quantization grades based on at least two corresponding actual sub-band distortion values to determine a quantizer value for a current sub-band corresponding to a target sub-band distortion for the current sub-band; and quantizing the sub-bands with the determined quantizer values;

wherein distributing the target distortion comprises redistributing an unsatisfied portion of a target sub-band distortion for a current sub-band to subsequent sub-bands based on energy weights of the subsequent sub-bands.

30. The system of claim 29, wherein the operations further comprise:

presenting a preview to demonstrate a result of the quantization according to the target distortion;

repeating the interpolating, quantizing and presenting operations, but not the ascertaining operation, in response to a change in the target distortion; and compressing the quantized sub-bands.

* * * * *

UNITED STATES PATENT AND TRADEMARK OFFICE
CERTIFICATE OF CORRECTION

PATENT NO. : 7,639,886 B1  
APPLICATION NO. : 10/958802  
DATED : December 29, 2009  
INVENTOR(S) : Anubha Rastogi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Ninth Day of November, 2010

David J. Kappos  
*Director of the United States Patent and Trademark Office*